(12) United States Patent
Aiello et al.

(10) Patent No.: US 10,013,480 B2
(45) Date of Patent: Jul. 3, 2018

(54) METHOD AND SYSTEM FOR DECOMPOSING SOCIAL RELATIONSHIPS INTO DOMAINS OF INTERACTIONS

(71) Applicant: EXCALIBUR IP, LLC, New York, NY (US)

(72) Inventors: Luca Maria Aiello, Barcelona (ES); Rossano Schifanella, Turin (IT); Bogdan State, Palo Alto, CA (US)

(73) Assignee: EXCALIBUR IP, LLC, New York, NY (US)

( * ) Notice: Subject to any disclaimer, the term of this patent is extended or adjusted under 35 U.S.C. 154(b) by 336 days.

(21) Appl. No.: 14/226,304

(22) Filed: Mar. 26, 2014

(65) Prior Publication Data

US 2015/0278346 A1 Oct. 1, 2015

(51) Int. Cl.
*G06F 17/30* (2006.01)

(52) U.S. Cl.
CPC .. *G06F 17/30663* (2013.01); *G06F 17/30705* (2013.01); *G06F 17/30958* (2013.01)

(58) Field of Classification Search
CPC ......... G06F 17/30663; G06F 17/30705; G06F 17/30958
See application file for complete search history.

(56) References Cited

U.S. PATENT DOCUMENTS

| 8,375,024 B2* | 2/2013 | Goeldi | G06Q 10/00 707/709 |
|---|---|---|---|
| 9,418,117 B1* | 8/2016 | Molina | G06F 17/3053 |
| 2012/0124073 A1* | 5/2012 | Gross | G06F 17/30873 707/767 |
| 2012/0278625 A1* | 11/2012 | Narayanan | H04L 9/006 713/175 |
| 2014/0006319 A1* | 1/2014 | Anand | G06N 5/02 706/12 |
| 2014/0036023 A1* | 2/2014 | Croen | H04N 7/147 348/14.01 |
| 2014/0244664 A1* | 8/2014 | Verma | G06Q 30/0251 707/749 |
| 2014/0274246 A1* | 9/2014 | Tsai | G06N 5/00 463/9 |
| 2014/0297746 A1* | 10/2014 | Cheng | H04L 65/40 709/204 |
| 2014/0298204 A1* | 10/2014 | Jayaram | G06F 17/30106 715/753 |

(Continued)

OTHER PUBLICATIONS

Emre Kiciman et al, "Analyzing Social Media Relationships in Context with Discussion Graphs", Aug. 29, 2013, ACM, pp. 1-8.*

(Continued)

*Primary Examiner* — Jared M Bibbee
(74) *Attorney, Agent, or Firm* — James J. DeCarlo; Greenberg Traurig, LLP

(57) ABSTRACT

Social relationships may be decomposed into domains of interaction by analyzing electronic messages. A collection of electronic messages are used to characterize relationships between individuals, such as social ties in a social network, in terms of domains of interactions, and characterizing messages in terms of a type of social resource exchange. Some non-limiting examples of types of social resource exchanges associated with domains of interaction, which domains may be identified from electronic messages, include status, support and knowledge.

24 Claims, 8 Drawing Sheets

(56) References Cited

U.S. PATENT DOCUMENTS

2015/0046281 A1* 2/2015 Shivaswamy ...... G06Q 30/0631
705/26.7
2015/0278857 A1* 10/2015 Moon ................ G06Q 30/0252
705/14.5

OTHER PUBLICATIONS

Sergio Escalera et al., "Social Network Extraction and Analysis Based on Multimodal Dyadic Interaction", Sensors, pp. 1702-1719 (Year: 2012).*
William M. Campbell et al., "Social Network Analysis with Content and Graphs", Lincoln Laboratory Journal, vol. 20, pp. 62-81 (Year: 2013).*

* cited by examiner

| DoI | Most representative tokens |
|---|---|
| *Status* *Support* *Knowledge* | neighbor · library · like · congratulations · visit · wish · dear · good day · greeting · friend · soon · book · read · know · think · advice |
| *Status* *Support* | beautiful · wonderful · photo · capture · great shot · love · cute · year · happy · lol |

FlickrαNobii

FIGURE 4B

METHOD AND SYSTEM FOR DECOMPOSING SOCIAL RELATIONSHIPS INTO DOMAINS OF INTERACTIONS

FIELD OF THE DISCLOSURE

The present disclosure relates to characterizing social relationships using electronic messages, and more particularly to identifying domains of interactions, assigning electronic messages to domains of interactions, and characterizing social relationship(s) between users using identified domains of interactions to which the users' electronic messages are assigned.

BACKGROUND

Social interaction may be analyzed using a social exchange theory, which takes into account the costs versus the benefits of such social interaction. In other words, people might make a decision whether or not to interact socially by weighing the benefit(s) of such social interaction with the cost(s) of such social interaction. Simply put, one might elect to forego a social interaction with one or more other individuals if the cost of such social interaction, e.g., financial, temporal, effort, etc., are thought to outweigh the benefit of the interaction, e.g., fun, companionship, etc. A positive interaction may be one in which the benefit is at least equal to the cost, and a negative interaction might be one in which the benefit is less than the cost.

SUMMARY

Increasingly, people are communicating with each other electronically, e.g., via electronic messages. Electronic messages may comprise electronic mail messages, short messages, social service posts, etc. These electronic messages may be considered to be social exchanges, which may be used in understanding and/or defining a dyad, or social relationship or tie, between two individuals. Embodiments of the present disclosure use electronic messages in characterizing relationships between individuals, such as social ties in a social network in terms of domains of interactions, and characterizing messages in terms of a type of social exchange, or a type of social resource exchange. A social exchange, or type of social exchange, may be characterized by a social resource, such as status, support, knowledge, etc., that is exchanged and each domain may be associated with a type of social exchange.

A better understanding of users, e.g., social network users, is achieved using characterizations of relationships and interchanges between users using the electronic exchanges between the users. By way of a non-limiting example, users whose message exchanges are characterized as belonging to a knowledge exchange domain of interaction are more likely to be interested in literary item recommendations than users involved in social support exchanges. Domains of interaction may also be considered in collaborative filtering for item recommendation, diffusion of products via viral marketing, etc. Other non-limiting examples of applications are provided herein.

In accordance with one or more embodiments, a method is provided, the method comprising identifying, by at least one computing device, a first plurality of buckets and assigning each message of a plurality of messages to one or more buckets of the first plurality based on topics of the plurality of messages; creating, by the at least one computing device, a conversation graph comprising a plurality of nodes, each node corresponding to a bucket of the first plurality, and a plurality of edges, each edge connecting two buckets of the plurality and representing at least one transition of a plurality of transitions, each transition representing at least one pair of users of the plurality exchanging a pair of messages of the plurality of messages; defining, by the at least one computing device, one or more domains of interaction, each domain of interaction comprising a second plurality of buckets from the first plurality of buckets and representing a type of social resource exchange; and assigning, by the at least one computing device, each message of the plurality to at least one of the one or more domains of interaction, the assigning identifying at least one type of social resource exchange for each message.

In accordance with one or more embodiments a system is provided, which system comprises at least one computing device comprising one or more processors to execute and memory to store instructions to identify a first plurality of buckets and assigning each message of a plurality of messages to one or more buckets of the first plurality based on topics of the plurality of messages; create a conversation graph comprising a plurality of nodes, each node corresponding to a bucket of the first plurality, and a plurality of edges, each edge connecting two buckets of the plurality and representing at least one transition of a plurality of transitions, each transition representing at least one pair of users of the plurality exchanging a pair of messages of the plurality of messages; define one or more domains of interaction, each domain of interaction comprising a second plurality of buckets from the first plurality of buckets and representing a type of social resource exchange; and assign each message of the plurality to at least one of the one or more domains of interaction, the assigning identifying at least one type of social resource exchange for each message.

In accordance with yet another aspect of the disclosure, a computer readable non-transitory storage medium is provided, the medium for tangibly storing thereon computer readable instructions that when executed cause at least one processor to identify a first plurality of buckets and assigning each message of a plurality of messages to one or more buckets of the first plurality based on topics of the plurality of messages; create a conversation graph comprising a plurality of nodes, each node corresponding to a bucket of the first plurality, and a plurality of edges, each edge connecting two buckets of the plurality and representing at least one transition of a plurality of transitions, each transition representing at least one pair of users of the plurality exchanging a pair of messages of the plurality of messages; define one or more domains of interaction, each domain of interaction comprising a second plurality of buckets from the first plurality of buckets and representing a type of social resource exchange; and assign each message of the plurality to at least one of the one or more domains of interaction, the assigning identifying at least one type of social resource exchange for each message.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 illustrates phases in a process flow for use in accordance with one or more embodiments of the present disclosure.

FIG. 2, which comprises FIGS. 2A and 2B, provides an example conversation graph creation process flow for use in accordance with one or more embodiments of the present disclosure.

FIG. 3 provides an example of a portion of a conversation graph in accordance with one or more embodiments of the present disclosure.

FIG. 4A provides an example of a conversation graph generated using a collection of messages in accordance with one or more embodiments of the present disclosure.

FIG. 4B provides examples of domains of interaction and a set of representative tokens identified for each in accordance with one or more embodiments of the present disclosure.

DETAILED DESCRIPTION

Figure 1:
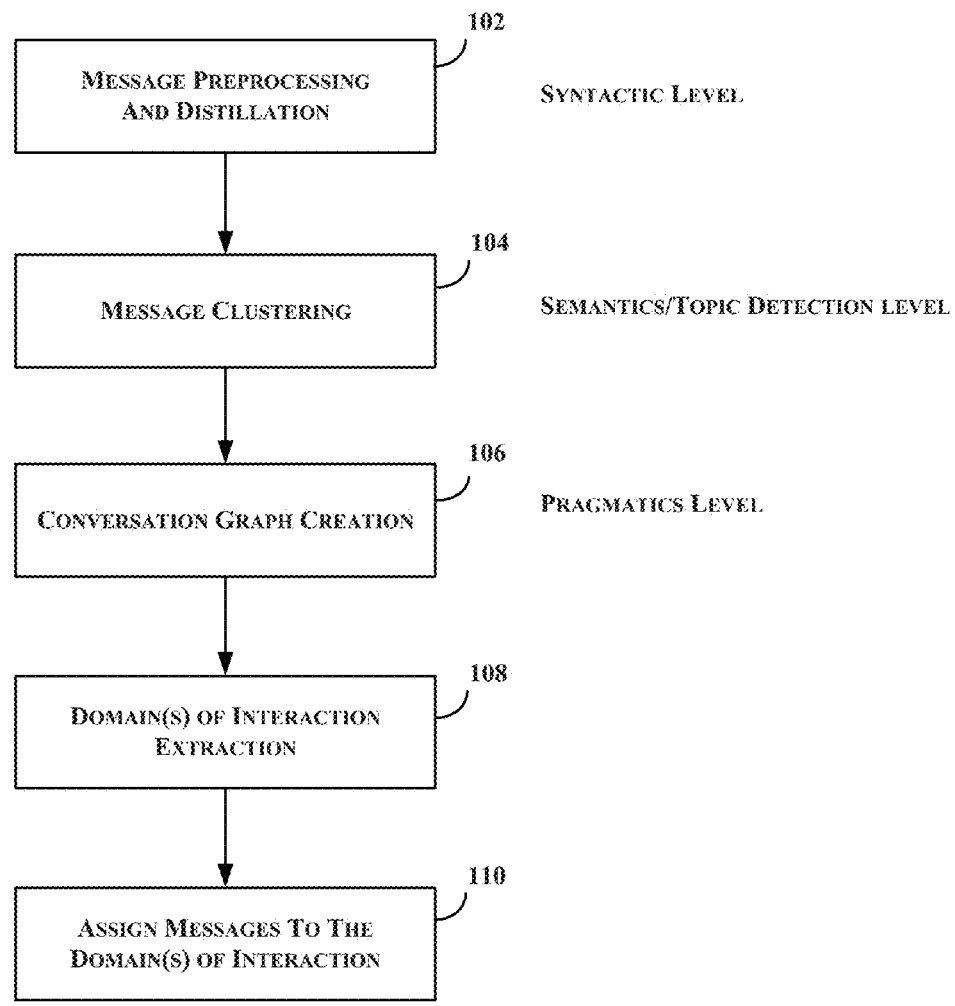

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture of decomposing social relationships into domains of interaction by analyzing electronic messages. As discussed herein, a message may be any type of interaction between individuals. By way of some non-limiting examples, a message may be a comment posted to a social networking site, such as comments about each other's photographs on a photo sharing site, such as Flickr!®, instant message conversations, such as those between users using Yahoo! ® Messenger, messages posted using Facebook®, electronic mail messages, messages posted to a website, such as the online book community website aNobii® or any other website, etc.

By way of some non-limiting examples, a message may be considered to belong to a status exchange domain of interaction where it contains explicit appreciation for the profile or activity of another user (e.g., his reviews, his tastes, the size of the library or the quality of photos); it announces the creation of a social tie; it points out commonalities between users and taste compatibility; it acknowledges the attention received from others, etc. A domain may be referred to as a social domain as it may represent a type of social exchange, which social exchange may be characterized by a social resource, e.g., status, support, knowledge. For example, a domain associated with status exchange as a type of social exchange may be referred to as asocial exchange domain of interaction. Of course, a social domain may be associated with any type of social exchange and/or social resource exchange.

The following is an example of a message that may identified as belonging to a status exchange domain of interaction: "Hi! Very interesting library! I added you as my neighbor." A message may be considered to belong to a social support domain of interaction where a purpose of the message is to greet or welcome someone to a website; it explicitly expresses affection or attachment; it contains wishes, jokes, or laughter, etc. The following is an example of a message that may identified as belonging to a social support domain of interaction: "Have a good weekend my dear." A message may be considered to belong to a knowledge exchange domain of interaction where it has a purpose is to share information and personal experience about books, reading, or related events such as book lovers' meetups; it asks for opinions or suggestions; it displays knowledge of the literary field; it asks for recommendations or suggestions, etc. The following is an example of a message that may identified as belonging to a knowledge exchange domain of interaction: "No, haven't read it, but I read some reviews and I'm curious."

In accordance with one or more embodiments, a social relationship may be modeled as message exchanges between a pair of individuals, and such a social relationship may be decomposed into one or more domains of interaction. A domain of interaction may be considered to represent a fundamental way in which we communicate with one another. By way of a non-limiting example, the messages exchanged between user a and user b may be used to define a social relationship between the users, such as the users' relationship may be characterized as 30% knowledge, 20% status giving and 50% social support.

Embodiments of the present disclosure analyze as input a set of messages M and a population of users U, each message $m_{u,v}{}^t \in M$ represents an electronic message, e.g., a textual communication, between a source $u \in U$ and destination $v \in U$ at time t, to generate a probabilistic clustering of messages in M and a probability that a message m is assigned to a cluster D may be represented as $p(m,D) \geq 0$. Embodiments of the present disclosure are described herein in connection with textual messages. It should be apparent, however, that messages may contain additional or other content, such as audio, multimedia, etc. content.

In accordance with one or more embodiments of the disclosure, messages are grouped together according to the type(s) of social exchange the messages convey using a multi-phase approach. Each message may be modeled as a probability distribution over a plurality of domains of interaction. An aggregation of the probabilities of distribution of all of the messages between a pair of individuals yields a summarization of the social relationship between the individuals, such as and without limitation a social relationship may be summarized as being 20% status exchange and 60% social support and 20% knowledge exchange.

In accordance with one or more embodiments, one or more domains of interaction may be automatically detected using a set, or collection of messages, and each message in the set may be assigned to one or more domains of interaction. Messages may be processed regardless of the language used in the messages, e.g., the approach used is language independent.

FIG. 1 illustrates phases in a process flow for use in accordance with one or more embodiments of the present disclosure. Elements of the process flow include message preprocessing and distillation 102, message clustering phase 104, conversation graph creation phase 106, domain(s) of interaction phase 108, and message assignment 110. In preprocessing and distillation 102, messages may be preprocessed and distilled. Preprocessing and distillation 102 may be considered to be a syntactic level of message processing. In message clustering 104, messages are clustered in buckets according to their similarity, e.g., textual similarity. Messaging clustering 104 may be considered to be a semantic, or topic detection, level. A pragmatics level is provided by conversation graph creation 106. In conversation graph creation 106, a conversation graph is created that models transitions between buckets identified by social interactions. In domain of interaction(s) 108, one or more dense portions of the conversation graph may be identified, each of which corresponds to a domain of interaction. As discussed in more detail below, the dense portion(s) of the conversation graph may be identified using a community detection algorithm.

Messages, such as messages in social media conversations, may be free-form and highly unstructured, with variations in quality, e.g. messages may include typographical and/or spelling errors, and may include variations, or nuances, in style, e.g. idioms, inflections, etc. Referring again to the message preprocessing and distillation 102, one or more filters may be applied to the messages to filter out such variations. The filters may be applied in series, and may comprise one or more filters used in information retrieval. By way of a non-limiting example, the filters may remove non-alphanumeric strings, stopwords, frequent and infrequent terms. A frequent term may be a term that appears in at least a certain percentage, e.g., 60%, of messages while an infrequent term may be a term that appears in less than a certain percentage, 1%, of the messages, for example. Message preprocessing and distillation 102 may also use a stemming algorithm to reduce inflected forms to a root, e.g., stemming may reduce the words fishing, fished and fisher to the root word fish. Tokenization may be used to decompose a text string into meaningful tokes, or elements, such as words, phrases, symbols, etc.

A message representation may be expanded with the insertion of bi-grams and tri-grams, which may yield term sequences with added discrimination over single terms. By way of a non-limiting example, a bi-gram "great shot" is likely to be more informative than the individual terms "great" and "shot." An adoption of n-grams may lead to an explosion of the dimensionality of the feature space; thus, an upper bound based on term frequency may be used. By way of a non-limiting example, an upper bound on the number of n-grams may be a number, s, of the most frequent n-grams, where s may be equal to 1,000 and $n \in [1, \ldots, 3]$, for example. Messages that do not contain elements in the most-frequent n-gram vocabulary may be filtered out.

In accordance with one or more embodiments, element 102 may generate a term-document matrix $\Gamma_{m \times n}$:$w_{ij}$, where m is a number of terms in a vocabulary and n is a number of messages in a message corpus, or collection set. By way of a non-limiting example, each row of the matrix comprises a vector and each bit in the vector corresponds to a term i in the vocabulary, and the bit's value indicates whether the message represented by the vector contains the term represented by the bit. By way of a further non-limiting example, $w_{ij}$ may be used to reflect an importance of the corresponding term i with respect to the semantics of message j, which importance may be calculated using, for example, a term frequency-inverse document frequency (TF-IDF) weighting scheme with sublinear TF scaling. In accordance with one or more embodiments, TF-IDF, or other method, may be used to determine the frequency of a term in an electronic message and a frequency of the term in a corpus, e.g., a collection of electronic messages.

In accordance with one or more embodiments, the matrix generated in element 102 may be used as input to element 104, which clusters messages. In accordance with one or more embodiments, messages are clustered using the term-document matrix generated in element 102. In accordance with one or more such embodiments, a probabilistic generative model is created, using a statistical model generator, such as and without limitation a Non-negative Matrix Factorization (NMF) model generator. The generated model may be used to cluster messages into groups according to their textual content. In accordance with one or more embodiments, clusters are homogeneous clusters. The clusters may also be referred to as message buckets. A bucket may correspond to a topic and each bucket represents a set of messages that convey the topic associated with the bucket. One or more n-grams may be selected, e.g., using NMF, for each bucket, such that the selected n-gram(s) represents a topic, e.g., a primary or main topic, associated with the bucket. Of course, it should be apparent that any method now known or later developed may be used to assign messages to bucket and to identify a topic associated with each bucket. In accordance with one or more embodiments, the message may be assigned to more than one bucket.

To further illustrate in connection with element 104, a term-document matrix generated in element 102 may be factored, e.g., using an NMF model, into multiple, e.g., 2, matrices. By way of a non-limiting example, the term-document matrix $\Gamma_{m \times n}$:$w_{ij}$ is factored into two matrices, $W_{m \times k}$ and $H_{k \times m}$, such that $\Gamma = WH + e$, where e is an m×n matrix of approximation errors and where k<<m. In other words, entries of the matrix W represent a probability of each of the m terms belonging to each of the k buckets, whereas the matrix H represents a probability of each bucket including each of the n messages. A message may convey multiple informational units or topics and consequently belong to multiple, different buckets. Matrix decomposition may map a message into a set of most representative buckets, relative to the other buckets, and may map a bucket into a set of n most characterizing terms, relative to other terms. The functions may be represented as follows:

1. $A(H, m_i)$ represents a function that maps a message $m_i$ into a set of most representative buckets, and
2. $B(W, b_i, n)$ represents a function that maps a bucket $b_i$ into a set of n most characterizing terms.

By way of a non-limiting example, the number of buckets k may be application dependent and may vary with the characteristics of the particular data set used in the application. Various methods now known or later developed may be used in evaluating an optimal value for k. By way of a further non-limiting example, an iterative approach may be used to identify a value for k that minimizes the error e, such as and without limitation selecting a value for k that minimizes a norm, e.g., Frobenius norm, of the error matrix e.

In accordance with one or more embodiments, the output of element 104, e.g., matrices W and H, may become input to element 106. In element 106, a conversation graph, e.g., a weighted directed graph, may be created. The graph may comprise nodes representing buckets, or topics, and edges representing transitions between buckets, which transitions may be determined by conversational flow. By way of a non-limiting example, given a message sent by sender a to recipient b, which is determined to belong to bucket i in element 104, a likelihood, or probability, may be identified, and encoded in the conversation graph created in element 106, which probability represents a probability that recipient b will reply back to sender a with a message belonging to bucket j.

Figure 2A:
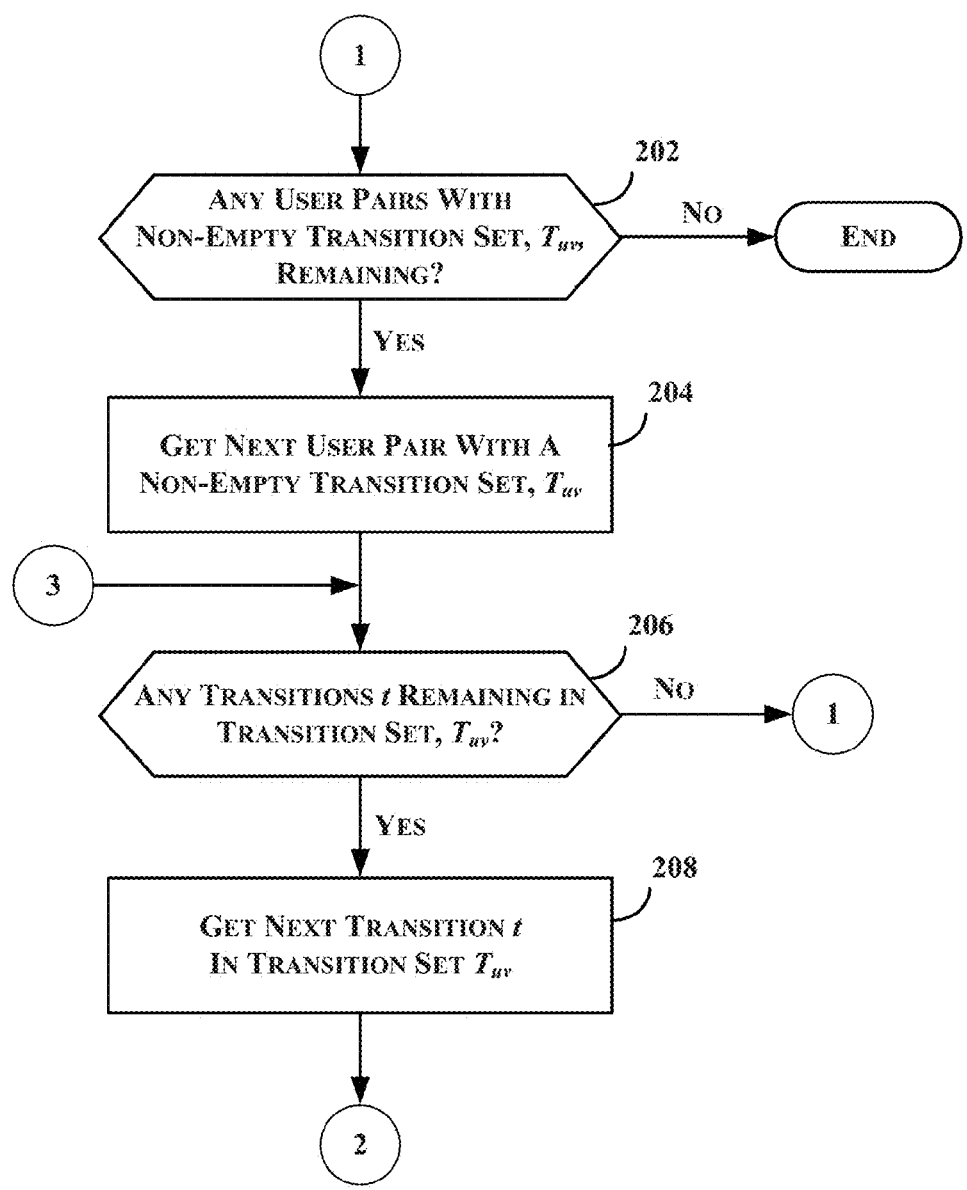
Figure 2B:
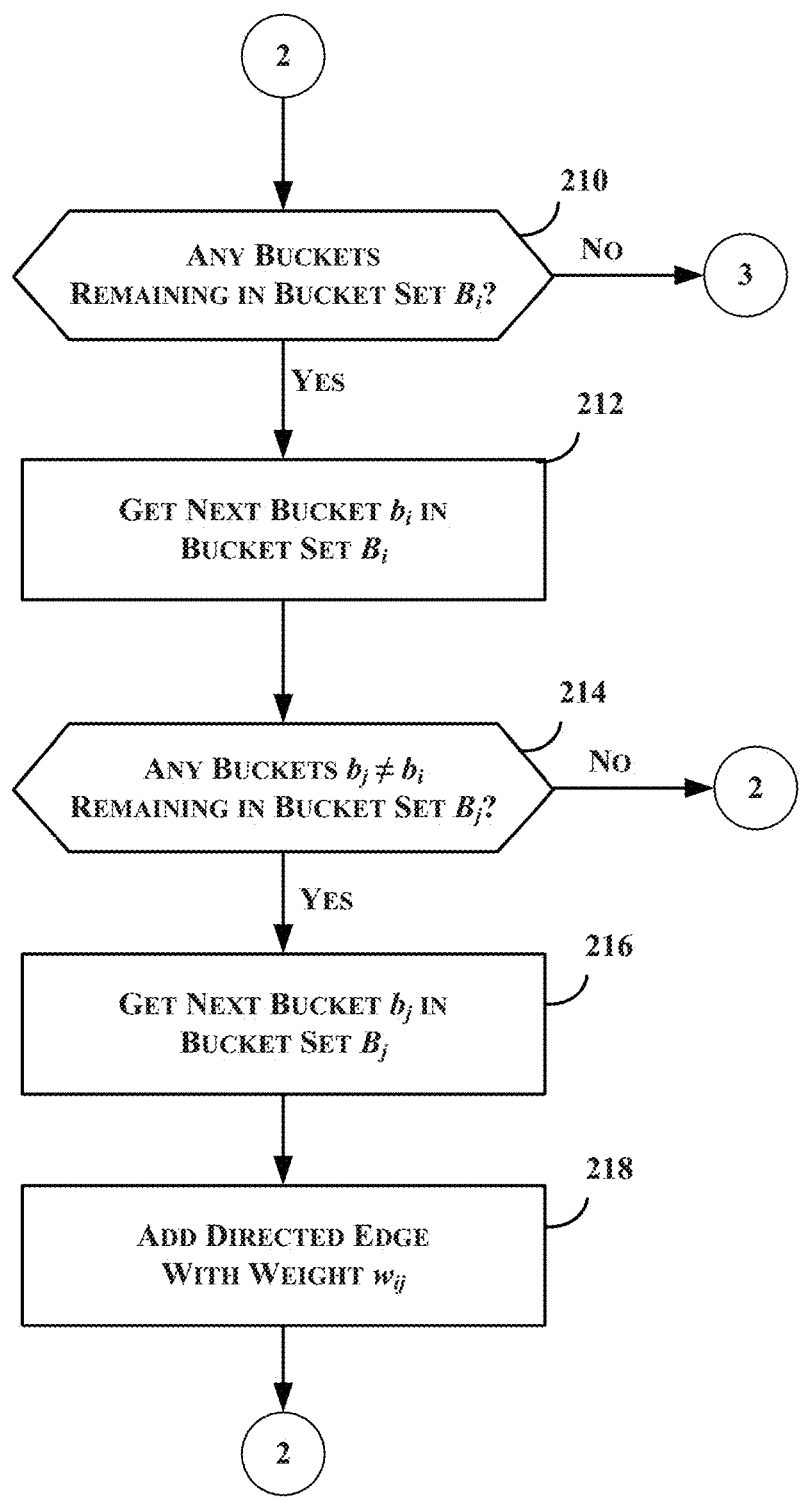

In accordance with one or more embodiments, a dataset that is used comprises information about each message in a collection of messages. In addition to information identifying the sending and receiving users, the information about a message includes a time, or timestamp. For any pair of users, e.g., user u and user v, the dataset may be used to identify a time-ordered sequence of messages between them, a transition $t_{uv} = (m_{uv}^{t_0}, m_{uv}^{t_1})$, $t_0 < t_1$ may be defined using a pair of two consecutive messages sent between user u and v. For each pair of users comprising user u and user v, a set of transitions $T_{uv}$ between than may be identified, the set comprising some number of transitions, t. FIG. 2, which comprises FIGS. 2A and 2B, provides an example conversation graph creation process flow for use in accordance with one or more embodiments of the present disclosure.

In the example shown in FIG. 2, each user pair having a non-empty transition set is processed. At step 202, a determination is made whether or not there are any remaining user pairs, e.g., user u and user v, for which a non-empty transition set, $T_{uv}$, exists. If not, processing ends. If a determination is made that there is at least one user pair with a non-empty transition set, processing continues at step 204 to get the next user pair with a non-empty transition set, $T_{uv}$.

For each transition $t \in T_{uv}$, with $t=(m_x, m_y)$, the most representative bucket(s) may be identified as in phase 104. By way of a non-limiting example, a set, $B_i$, of one or more bucket may be identified for $m_x$ using function $A(H, m_x)$ and a set, $B_j$, comprising one or more buckets may be identified for message $m_y$ using function $A(H, m_y)$.

At step 206, a determination is made whether or not any transition t in transition set $T_{uv}$ remains to be processed for the current user pair? If not, processing continues at step 202 to process any remaining user pairs with a non-empty transition set, $T_{uv}$. If a determination is made, at step 206, that at least one transition t remains to be processed, processing continues at step 208 to get the next transition t in transition set $T_{uv}$, and processing continues at step 210 of FIG. 2B. At step 210, a determination is made whether any bucket $b_i$ remains to be processed in bucket set $B_i$ for the current transition, t. If not, processing continues at step 206 of FIG. 2A to process any remaining transition t in the current user pair's transition set $T_{uv}$.

If a determination is made, at step 210, that at least one bucket $b_i$ remains to be processed in bucket set $B_i$ for the current transition t, processing continues at step 212 to get the next bucket $b_i$ in bucket set $B_i$. At step 214, a determination is made whether any buckets $b_j$ not equal to the current bucket $b_i$ remain to be processed from bucket set $B_j$. If not, processing continues at step 210 to process any remaining buckets $b_i$ from bucket set $B_i$ for the current transition t. If a determination is made, at step 214, that at least one bucket $b_j$ that is not equal to the current bucket $b_i$ remains to be processed, processing continues at step 216 to get the next bucket $b_j$ from the bucket set $B_j$.

At step 218, an edge, e.g., a directed edge, is added to the conversation graph for the current transition. By way of a non-limiting example, a directed edge $b_i \rightarrow b_j$ points from $b_i$, the bucket associated with the message $m_x$, or $m_{uv}^{t_0}$, to the bucket $b_j$, the bucket associated with message $m_y$, or $m_{uv}^{t_1}$, where $t_0 < t_1$ in time. The edge has an associated weight $w_{ij}$, which may be proportional to the probability of the messages $m_x$ and $m_y$ belonging to their corresponding buckets, $b_i$ and $b_j$ (respectively). By way of a non-limiting example, each weight $w_{ij}$ may be retrieved from matrix H determined in element 104 of FIG. 1. By way of a non-limiting example, the weight $w_{ij}$ may be an aggregate of the probabilities of the messages $m_x$ and $m_y$ belonging to their corresponding buckets, $b_i$ and $b_j$ (respectively). Processing continues at 210 to process any remaining buckets $b_i$ in bucket set $B_i$ for the current transition t.

Figure 3:
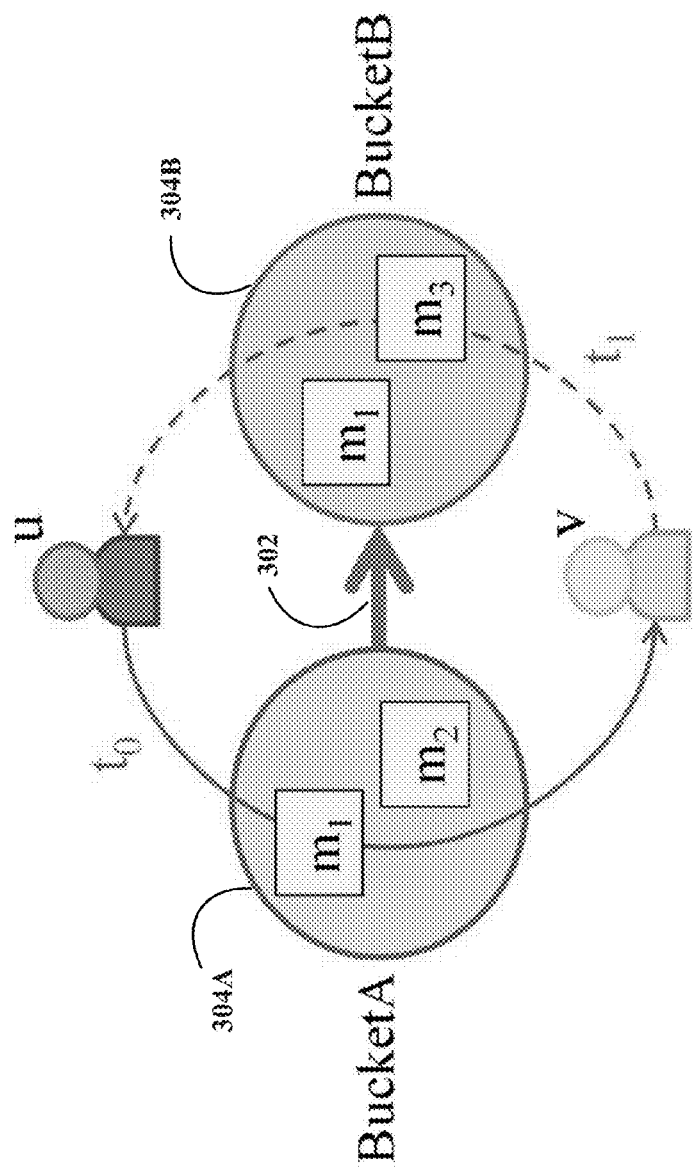

FIG. 3 provides an example of a portion of a conversation graph in accordance with one or more embodiments of the present disclosure. In the example, the conversation graph comprises two nodes 304A and 304B, each of which represents a bucket, e.g., buckets A and B, respectively. Also shown in the diagram, for purposes of illustration, are users u and v; messages $m_1$, $m_2$ and $m_3$, an arc labeled $t_0$ associated with message $m_1$ and an arc labeled $t_1$ associated with message $m_3$. In the example, time $t_0$ is earlier than time $t_1$, e.g., message $m_1$ is sent to user v by user u and message $m_3$ is sent by user v to user u in reply thereafter. In addition and as is illustrated in the example shown in FIG. 3, message $m_1$ belongs to buckets A and B, and message $m_3$ belongs to bucket B. The interaction between user u and user v using messages $m_1$ and $m_3$ implies that there is a transition, e.g., a conversational transition, from messages in bucket A to messages in bucket B. Directed edge 302 between buckets A and B represents the transition. Although not shown in the example of FIG. 3, a weight $w_{ij}$ may be associated with the edge 302. In accordance with one or more embodiments, edge 302 may represent more than one transition and more than one pair of users. Weight $w_{ij}$ may represent a frequency of a transition from one bucket to another bucket, e.g., a volume of transitions between two buckets.

In accordance with one or more embodiments, a conversation graph may be used to identify a likelihood that a message belonging to a bucket triggers a response that belongs to the other bucket. Transitions between messages belonging to different buckets may be said to increase a likelihood of the two buckets being in the same domain of interaction. As is discussed in more detail below, node 304A, which represents bucket A, and node 304B, which represents bucket B, may be assigned to the same or a different domain of interaction.

A conversation graph may be considered to shape a transition between classes of coherent messages. In addition, interactions in the form of electronic messages may be considered to represent an exchange of social resources. Examples of social resources include but are not limited to knowledge exchange, social support and status exchange. Where a message conveys a certain type of resource and a response to the message conveys the same type of resource in response, the interaction may be said to have reciprocity, or be reciprocal. In addition and where reciprocation exists, the reciprocal interaction may be in the same social domain as the initial interaction. By way of a non-limiting example, a person who receives social support for the loss of a relative, e.g., in an electronic message saying "I'm sorry for your loss", and elects to reply is more likely than not to reply in kind with another social support interaction, e.g., via an electronic messaging saying "Thank you for being a good friend," than to reply with a status-exchange interaction, e.g., via a message saying "You're such a great photographer!".

Such a notion of reciprocity tends to yield a conversation graph with clusters of buckets, each cluster aggregating buckets that carry homogeneous patterns of social exchange. Furthermore, there are likely to be fewer edges connecting a cluster, and/or the buckets in the cluster, to other clusters, or buckets, in the graph. In accordance with one or more embodiments, a network community detection algorithm may be applied to a conversation graph to discover dense areas, each of which represents a cluster aggregating a number of buckets. By way of a non-limiting example, a Python implementation of a Spinglass algorithm may be used on a conversation graph to detect one or more clusters. Of course, it should be apparent that any method now known or later developed may be used to identify clusters of buckets. The clusters identified in element 108 are referred to as domains of interaction.

Figure 4A:
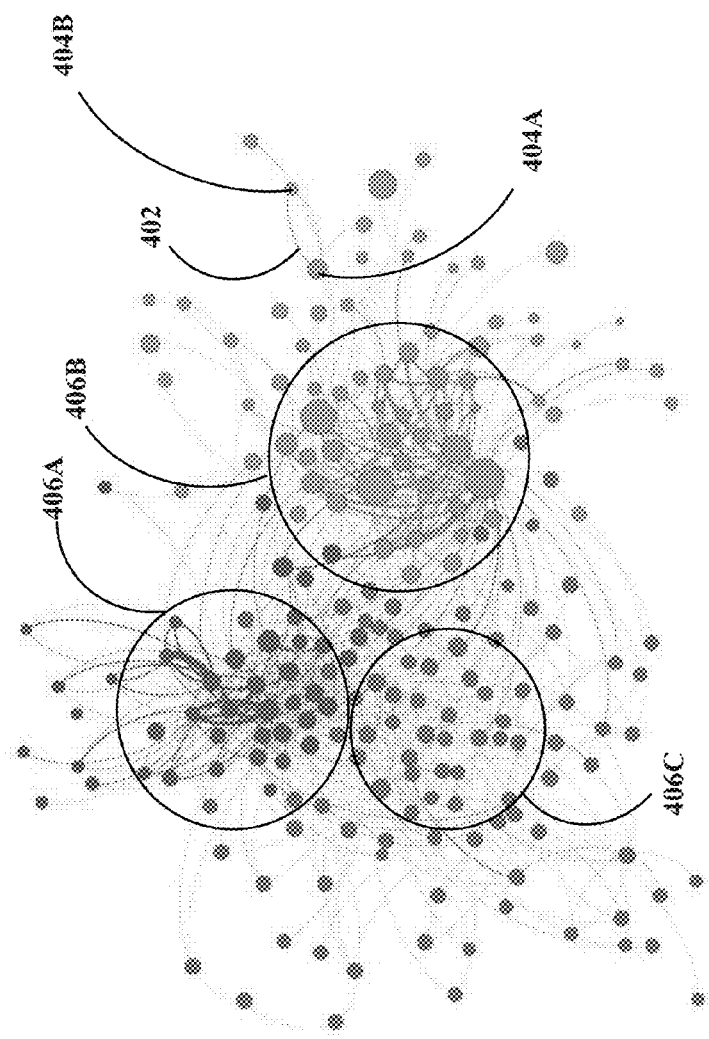

FIG. 4A provides an example of a conversation graph generated using a collection of messages in accordance with one or more embodiments of the present disclosure. The conversation graph shown in the example may be generated using element 106 of FIG. 1, for example. The conversation graph comprises nodes 404, each of which corresponds to a bucket identified in message clustering, such as that provided by element 104 of FIG. 1, and edges 402 identified in creating the conversation graph, such as that performed by element 106. In the example shown, a size of each node may be based on the number of messages assigned to the corresponding bucket and the thickness of each edge may correspond to a weighted number of transitions between buckets. In the example conversation graph shown in FIG. 4, an edge that has no weight is not shown.

In the example, clusters of nodes are indicated by circles representing clusters 406. Each cluster corresponds to a domain of interaction, which may be identified in element 108 of FIG. 1, for example. By way of some non-limiting examples, cluster 406A may correspond to asocial support domain of interaction, cluster 406B may correspond to a status exchange domain of interaction and cluster 406C may correspond to a knowledge exchange domain of interaction. While the example shows three domains of interaction, it should be apparent that any number of domains of interaction may be identified using a conversation graph and embodiments of the present disclosure. Furthermore, it should be apparent that domains of interaction other than those discussed in connection with the example conversation graph may be identified using embodiments of the present disclosure.

Each domain comprises one or more buckets and each bucket comprises one or more messages. Thus, each domain may comprise a number of messages, or interactions by which resources are exchanged. In a given domain, interactions tend to be homogenous. A social interaction, e.g., an electronic message, conveying a resource, e.g., social support, is likely to be reciprocated, e.g., an electronic message as a response, conveying the same resource, e.g., social support.

Referring again to FIG. 1, at step 110, messages may be assigned to the domains of interaction identified in step 108. In accordance with one or more embodiments, each message may be assigned to each domain of interaction that includes at least one bucket containing the message. Each message assignment may have an associated probability, which probability may be equal to a maximum probability of the message belonging to one of those buckets. By way of a non-limiting example, assuming that a message is assigned to a domain of interaction based on its inclusion in three buckets belonging to the domain of interaction, the message has three probabilities, each one representing a probability that the message belongs to a respective one of the three buckets. A probability that the message belongs to a domain of interaction may be set to the highest of the three probabilities.

By way of a non-limiting example, in a case that there are three domains of interaction, #1, #2 and #3, a message may have a probability of belonging to each of #1, #2 and #3, such as 90%, 0%, and 10%, respectively.

In accordance with one or more embodiments, one or more labels may optionally be assigned to each domain of interaction. Such labels may be identified by an inspection of the domains by an expert, e.g., a sociologist. Where labeling is performed for a domain, the messages belonging to a given domain may be associated with the domain's labeling.

FIG. 4B provides examples of domains of interaction and a set of representative tokens identified for each in accordance with one or more embodiments of the present disclosure. The terms for each domain of interaction may be selected by summing the weights of the terms in each bucket. The weights of the terms may be the weights determined in element 104 of FIG. 1. The example shown in FIG. 4B includes domains of interaction identified for two different sets of messages, a set of posts collected for the online site aNobii® and a set of posts collected for the online site Flickr®.

Embodiments of the present disclosure enable a smart summarization of conversations, e.g., conversations conducted via electronic messaging, and enable a smart summarization of social ties between the conversationalists, e.g., users exchanging electronic messages.

Embodiments of the present disclosure characterize an electronic message, or interaction, between users in terms of a type, or types, of social interaction. This may be contrasted with an assignment of a topic to an electronic message. By way of a non-limiting example, consider the topics of sports and politics. Using a topic analysis of electronic messages exchanged between user a and user b, it might be determined that the users conversed 50% of the time about sports and 50% of the time about politics. Topic analysis is limited to topic identification and is not able to analyze electronic messages exchanged between the users to determine a type of social interaction, e.g., knowledge exchange, status exchange, social support, etc. and/or to characterize an electronic message in terms of its type(s) of interaction. To illustrate further with the following text that may be conveyed via electronic messaging:

a) "Lionel Messi became the youngest player to score 200 goals in the A league."

b) "Woohoo! Messi scored another goal!"

The above statements share topics, e.g., sports, soccer and soccer player Lionel Messi; however, the two statements possess different communication and social purposes. The first statement has as at least one of its purposes that of transferring knowledge, which may be contrasted with a purpose of the second statement, which is to convey an emotion, e.g., a positive emotion.

Characterization of messages in terms of their type of social exchange has applications in a number of areas, including the following non-limiting examples.

In one example, profiling, such as user profiling, social link profiling, etc., which profiling may be based on the type(s) of user interactions, may be used for recommendation, service personalization, etc. In accordance with one or more embodiments of the present disclosure, each user may be profiled using a weighted vector representing a ratio of messages that the user sends (or receives) inside each domain of interaction. By way of a non-limiting example, using two domains of interaction #1 and #2, the vector may comprise two probabilities one for each domain of interaction. Users engaged in conversations that are predominantly characterized by certain domains might be interested in different kinds of item consumption or types of service engagement. In aNobii®, for instance, people exchanging knowledge may be more interested in the service's ability to provide good recommendations for literary items, which may be contrasted with those users that are primarily using the service for social interaction. Similarly, people more involved in the process of status-giving might be more engaged by incentives offered by the service, such as rewards for being more active in the community (e.g., a prize in "points" if a new book review is submitted). aNobii® is used as an example, it should be apparent that other services may make use of such user information provided in accordance with one or more embodiments of the present disclosure.

Another aspect of profiling involves link profiling. Social dyads, such as pairs of individuals, exchanging different social resources might react differently to different signals. As an example, with the current models of social links, a pair of Flickr® users talking about photographic techniques and a pair of users laughing about their pictures together are considered in the exact same way. In accordance with at least one embodiment, users may be differentiated by decomposing each social link into one or more domains of interaction, which may be used in applications such as any recommendation technique that uses a social network as an input. By way of some non-limiting examples, such applications may include a recommendation system may be based on collaborative filtering, a product diffusion application that uses viral marketing techniques, etc. The social network may be further refined into sub-networks, such as and without limitation knowledge, status or social support sub-networks, for purposes of collaborative filtering-based recommendations, viral marketing of products, etc.

Information about types of interactions identified between users in accordance with one or more embodiments of the present disclosure may be used by social network providers to provide users with a history of their relationship. By way of a non-limiting example, a friendship page on Facebook® presents a history of a relationship between two connected users by means of showing multimedia items of their experiences together (photos, messages) on a timeline. A decomposition of s conversation history between the two users in accordance with one or more embodiments yields one or more domains of interactions, which may be presented to the users as a different way of summarizing their relationship. By way of a non-limiting example, a relationship summary may comprise a summary of two users' relationship based on their conversation type(s), e.g., as part of the users' friendship page on Facebook®. By way of a further non-limited example, the users' relationship might be summarized, which summary may be based on the domains of interaction identified by analyzing the users' conversations through Facebook®, and indicate that there relationship is composed of 30% knowledge exchange, 20% status giving and 50% social support.

Other interface-oriented applications are possible using embodiments of the present disclosure, including without limitation user interface customization based on the type of interaction(s) identified for a user. By way of a non-limiting example, a user interface might be customized such that one or more areas of the user interface may be emphasized based on a user's determined type(s) of interaction, e.g., emphasize comment input box versus an input box for sending direct messages to others.

Analytics is another application that may make use of information provided in accordance with one or more embodiments of the present disclosure. By way of a non-limiting example, service providers of online social networks are interested in understanding the dynamics of the collective discourse of their user bases. To facilitate this, embodiments of the present disclosure provide information that address questions about users' interests, e.g., whether users subscribed in social groups are more interested in socializing or accessing high-quality multimedia content, identification of an evolution of the type of the overall discourse in a social platform, from its birth to its current state, etc.

On an online social network service such as Flickr®, for instance, information may indicate that smaller-size groups are more likely to be involved in conversations conveying social support, while members of larger groups may instead tend to have more expressions of status giving instead. While each group in Flickr may be associated with a topic, information identifying the topic of the group cannot and does not indicate that small groups are more skewed towards a social component while bigger groups tend to consider the service as being a place for sharing photos, opinions, etc. and receive appreciation from others.

As yet another non-limiting example, on a social networking site such as aNobii®, information provided in accordance with one or more embodiments of the present disclosure may be used to determine that the service is being used in an intended manner, e.g., the service is or has evolved such that users are interacting more and more in the "knowledge exchange" domain. Thus and in a case that the service is meant to foster an exchange of opinions and knowledge about books, the domain(s) of interaction identified using comments provided by users using the service may server to reinforce the fact that the service is going in the right direction and fostering its users to use the service as it is intended to be used, e.g., to exchange opinions and knowledge about books.

Another non-limiting application example relates to user engagement and churn prediction. Engagement of users within a social platform depends on several factors, one of which is interaction with other users. A user that is just giving status to others but is not getting status from others may likely elect to churn out, or quit, the service. This might occur, for example, on a photo sharing site where the user is engaging with other users that may have a higher level of skill. Using one or more embodiments of the present disclosure, a situation in which a user gives status to others by expressing appreciation for their activity but does not receive status from others may be identified, and action may be taken to remedy the situation so that the user does not quit. By way of a non-limiting example, a contact recommender system might make recommendations identifying other users that are giving but not getting status, e.g., identifying other users with the same "status level" as contact recommendations, so that users that may have the same skill level may connect and do not feel left out.

As yet another example of an application, an electronic messaging service, e.g., an electronic mail service, may label a message with the one or more domains of interaction to which the message is assigned. Such information might be used by a message recipient to understand the type of social exchange intended by the sender, which acts as an aid to the recipient in responding to the sender's message, and by the sender to affirm that the message conveys the type of social exchange intended by the sender and/or to understand the response received.

The functionality provided in accordance with embodiments of the present disclosure provides information not possible using topic modeling or network analysis methods, which methods simply monitor the volume of activity in time or across groups and/or track the evolution of topics. Embodiments of the present disclosure analyze messages and yield information that identities types of user interactions, types of social exchanges and characterizes social relationships, for example.

Figure 5:
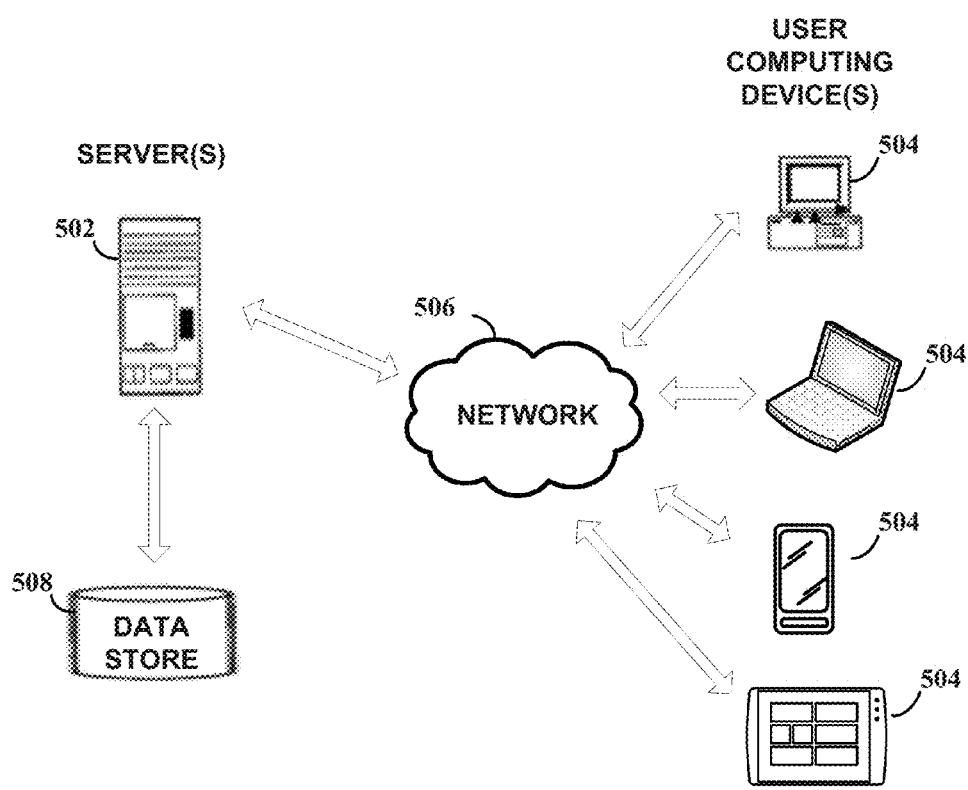
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 can be configured to execute program code, instructions, etc. to provide functionality in accordance with one or more embodiments of the present disclosure.

Computing device 502 can serve content to user computing devices 504 using a browser application via a network 506. Data store SOS can be used to store program code to configure a server 502 to provide functionality in accordance with one or more embodiments of the present disclosure.

The user computing device 504 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
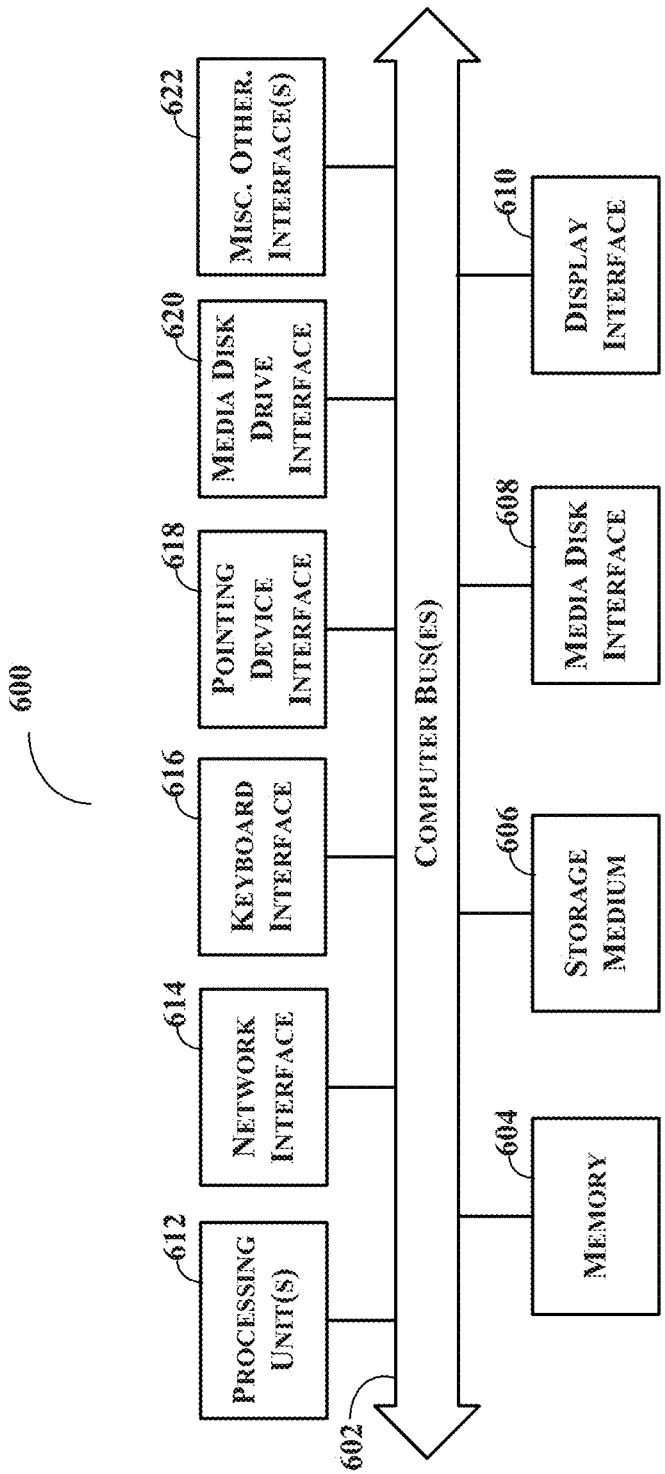
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
identifying, by at least one computing device, a first plurality of buckets and assigning each message of a plurality of messages to one or more buckets of the first plurality based on topics of the plurality of messages, each of the one or more buckets having one or more assigned messages;
creating, by the at least one computing device, a conversation graph comprising a plurality of nodes, each node corresponding to a bucket of the first plurality corresponding to a topic, and a plurality of directed edges, each directed edge connecting two buckets of the first plurality and indicating a transition direction from one bucket to the other bucket, the transition direction representing at least one transition of a plurality of transitions between the two buckets;
defining, by the at least one computing device, one or more domains of interaction, each domain of interaction comprising a second plurality of buckets from the first plurality of buckets connected by the directed edges and representing a type of social resource exchange; and
assigning, by the at least one computing device, each message of the plurality to at least one of the one or more domains of interaction, the assigning identifying at least one type of social resource exchange for each message.

2. The method of claim 1, further comprising:
assigning, by the at least one computing device, at least one type of social resource exchange to each user of the plurality.

3. The method of claim 1, at least one edge of the plurality representing more than one transition of the plurality.

4. The method of claim 3, further comprising:
assigning, by the at least one computing device, a weight to each edge between the two buckets of the first plurality, the weight representing a volume of transitions between the two buckets.

5. The method of claim 1, at least one edge of the plurality representing more than one transition of the plurality and more than one pair of users of the plurality.

6. The method of claim 1, further comprising:
using, by the at least one computing device, an edge between first and second buckets of the first plurality to represent a transition comprising first and second messages of the plurality, the first message being assigned to one of the first and second buckets and the second message being assigned the other of the first and second buckets.

7. The method of claim 6, the first and second messages each having an associated time, the first message's associated time is before the second message's associated time, the edge is pointing from the first bucket to the second bucket.

8. The method of claim 6, the first message having a first probability of belonging to the first bucket and the second message having a second probability of belonging to the second bucket, the edge include a weight that aggregates the first and second probabilities.

9. A system comprising:
at least one computing device comprising one or more processors to execute and memory to store instructions to:
identify a first plurality of buckets and assigning each message of a plurality of messages to one or more buckets of the first plurality based on topics of the plurality of messages, each of the one or more buckets having one or more assigned messages;
create a conversation graph comprising a plurality of nodes, each node corresponding to a bucket of the first plurality corresponding to a topic, and a plurality of directed edges, each directed edge connecting two buckets of the first plurality and indicating a transition direction from one bucket to the other bucket, the transition direction representing at least one transition of a plurality of transitions between the two buckets;
define one or more domains of interaction, each domain of interaction comprising a second plurality of buckets from the first plurality of buckets connected by the directed edges and representing a type of social resource exchange; and
assign each message of the plurality to at least one of the one or more domains of interaction, the assigning identifying at least one type of social resource exchange for each message.

10. The system of claim 9, the instructions further comprising instructions to:
assign at least one type of social resource exchange to each user of the plurality.

11. The system of claim 9, at least one edge of the plurality representing more than one transition of the plurality.

12. The system of claim 11, the instructions further comprising instructions to:
assign a weight to each edge between the two buckets of the first plurality, the weight representing a volume of transitions between the two buckets.

13. The system of claim 9, at least one edge of the plurality representing more than one transition of the plurality and more than one pair of users of the plurality.

14. The system of claim 9, the instructions further comprising instructions to:
use an edge between first and second buckets of the first plurality to represent a transition comprising first and second messages of the plurality, the first message being assigned to one of the first and second buckets and the second message being assigned the other of the first and second buckets.

15. The system of claim 14, the first and second messages each having an associated time, the first message's associated time is before the second message's associated time, the edge is pointing from the first bucket to the second bucket.

16. The system of claim 14, the first message having a first probability of belonging to the first bucket and the second message having a second probability of belonging to the second bucket, the edge include a weight that aggregates the first and second probabilities.

17. A computer readable non-transitory storage medium for tangibly storing thereon computer readable instructions that when executed cause at least one processor to:
identify a first plurality of buckets and assigning each message of a plurality of messages to one or more buckets of the first plurality based on topics of the plurality of messages, each of the one or more buckets having one or more assigned messages;
create a conversation graph comprising a plurality of nodes, each node corresponding to a bucket of the first plurality corresponding to a topic, and a plurality of directed edges, each directed edge connecting two buckets of the first plurality and indicating a transition direction from one bucket to the other bucket, the transition direction representing at least one transition of a plurality of transitions between the two buckets;
define one or more domains of interaction, each domain of interaction comprising a second plurality of buckets connected by the directed edges from the first plurality of buckets and representing a type of social resource exchange; and
assign each message of the plurality to at least one of the one or more domains of interaction, the assigning identifying at least one type of social resource exchange for each message.

18. The computer readable non-transitory storage medium of claim 17, the instructions further comprising instructions to:
assign at least one type of social resource exchange to each user of the plurality.

19. The computer readable non-transitory storage medium of claim 17, at least one edge of the plurality representing more than one transition of the plurality.

20. The computer readable non-transitory storage medium of claim 19, the instructions further comprising instructions to:
assign a weight to each edge between the two buckets of the first plurality, the weight representing a volume of transitions between the two buckets.

21. The computer readable non-transitory storage medium of claim 17, at least one edge of the plurality representing more than one transition of the plurality and more than one pair of users of the plurality.

22. The computer readable non-transitory storage medium of claim 17, the instructions further comprising instructions to:
use an edge between first and second buckets of the first plurality to represent a transition comprising first and second messages of the plurality, the first message being assigned to one of the first and second buckets and the second message being assigned the other of the first and second buckets.

23. The computer readable non-transitory storage medium of claim 22, the first and second messages each having an associated time, the first message's associated time is before the second message's associated time, the edge is pointing from the first bucket to the second bucket.

24. The computer readable non-transitory storage medium of claim 22, the first message having a first probability of belonging to the first bucket and the second message having a second probability of belonging to the second bucket, the edge include a weight that aggregates the first and second probabilities.

* * * * *